US00RE34366E

United States Patent [19]

Instance

[11] E Patent Number: Re. 34,366

[45] Reissued Date of Patent: Sep. 7, 1993

[54] LABEL

[76] Inventor: David J. Instance, Guinea Hall, Sellindge, Kent, United Kingdom

[21] Appl. No.: 449,539

[22] Filed: Dec. 12, 1989

Related U.S. Patent Documents

Reissue of:

[64] Patent No.: 4,744,161
Issued: May 17, 1988
Appl. No.: 58,894
Filed: Jun. 5, 1987

[51] Int. Cl.[5] ..... G09F 3/02; G09F 3/10

[52] U.S. Cl. ..... 40/299; 40/306; 40/310; 283/81; 283/103; 283/106; 428/43; 428/77; 428/124

[58] Field of Search ..... 428/43, 124, 77, 40; 40/2 R, 310, 306, 299; 283/81, 103, 106

[56] References Cited

U.S. PATENT DOCUMENTS

| | | | |
|---|---|---|---|
| 1,864,526 | 6/1932 | Brown | 40/306 |
| 1,891,353 | 12/1932 | Koehrman | 40/306 |
| 2,127,081 | 8/1938 | Brown | 40/306 |
| 2,680,629 | 6/1954 | Poczatek | 281/5 |
| 2,939,726 | 6/1960 | Fleischman | 282/19 |
| 4,323,608 | 4/1982 | Denny et al. | 428/43 |
| 4,529,229 | 7/1985 | Glibbery | 428/124 |
| 4,592,572 | 6/1986 | Instance | 428/43 X |

FOREIGN PATENT DOCUMENTS 1596306 8/1981 United Kingdom .

*Primary Examiner*—Alexander S. Thomas
*Attorney, Agent, or Firm*—Hill, Van Santen, Steadman & Simpson

[57] ABSTRACT

A label for attachment to a container, the label comprising a longitudinal strip which is divided into a series of panels by a plurality of transverse fold lines, the strip being folded about the transverse fold lines so that one end panel and the adjacent panel form rear and front cover panels, respectively, which envelope the remaining panel or panels of the folded strip, the rear cover panel of the strip being shorter in the longitudinal direction than at least the front cover panel and a third panel, which is adjacent the front panel, extending beyond the free end of the rear cover panel and having a rearwardly directed over-lapping portion; and a support web to which is adhered the rear face of the rear cover panel, the over-lapping portion being releasably adhered to the support web so as to maintain the folded label in a closed configuration, the arrangement being such that the label can be opened by detaching the over-lapping portion from the support web.

6 Claims, 1 Drawing Sheet

LABEL

Matter enclosed in heavy brackets [ ] appears in the original patent but forms no part of this reissue specification; matter printed in italics indicates the additions made by reissue.

BACKGROUND OF THE INVENTION

The present invention relates to a label and in particular to a self-adhesive label to be attached to a container such as a bottle, can, packet or the like.

SUMMARY OF THE INVENTION

The present invention provides a label for attachment to a container, the label comprising a longitudinal strip which is divided into a series of panels by a plurality of transverse fold lines, the strip being folded about the transverse fold lines so that one end panel and the adjacent panel form rear and front cover panels, respectively, which envelope the remaining panel or panels of the folded strip, the rear cover panel of the strip being shorter in the longitudinal direction than at least the front cover panel and a third panel, which is adjacent the front panel, extending beyond the free end of the rear cover panel and having a rearwardly directed over-lapping portion; and a support web to which is adhered the rear face of the rear cover panel, the over-lapping portion being releasably adhered to the support web so as to maintain the folded label in a closed configuration, the arrangement being such that the label can be opened by detaching the over-lapping portion from the support web.

BRIEF DESCRIPTION OF THE DRAWINGS

An embodiment of the present invention will now be described by way of example only with reference to the accompanying drawings, in which.

DESCRIPTION OF THE PREFERRED EMBODIMENTS

Figure 1:
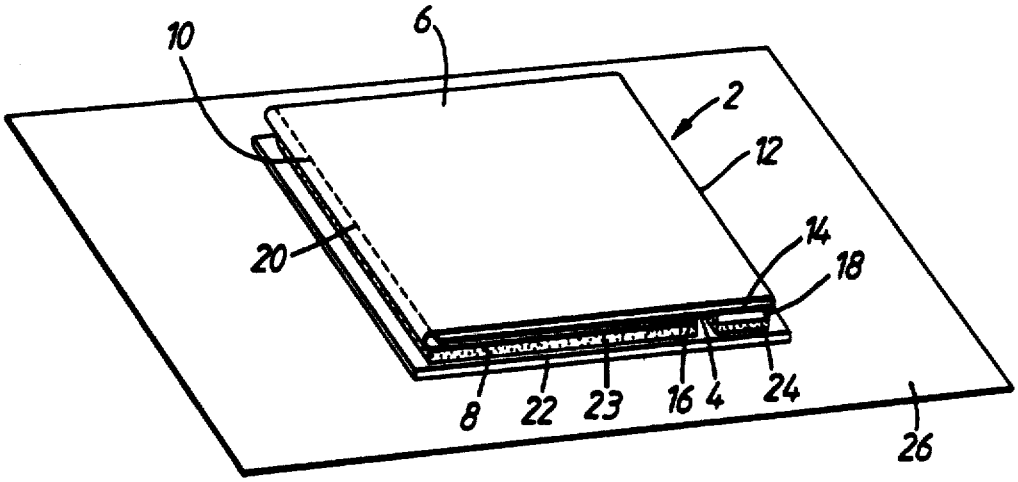
FIG. 1 is a perspective view of a label in accordance with the present invention in its folded condition and when carried on a release backing material.
Figure 2:
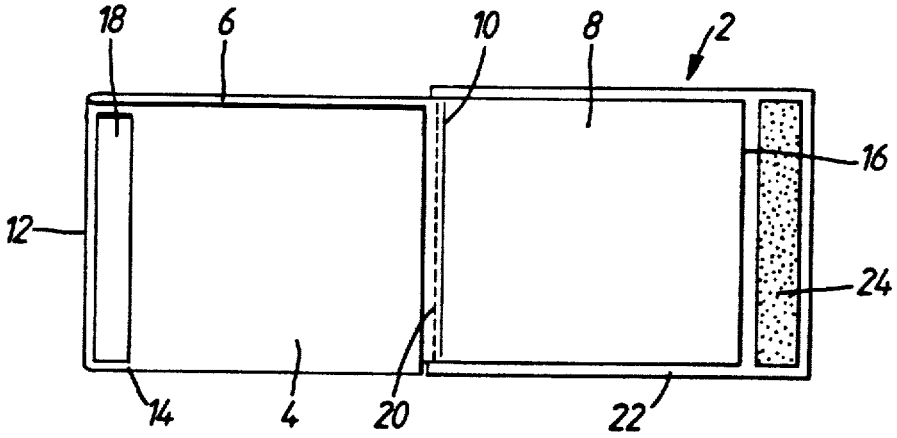
FIG. 2 is a plan view of the label of FIG. 1 in an unfolded condition.

Referring to FIGS. 1 and 2, a label 2 comprises a longitudinal sheet 4 e.g. of paper which is folded into a series of three panels 4, 6, 8 by a pair of transverse fold lines 10, 12. One end panel 4 and the middle panel 6 have substantially the same length in the longitudinal direction and are longer than the other end panel 8. The said one end panel 4 is folded about the transverse fold line 12 between the said one end panel 4 and the middle panel 6 so as to lie underneath the middle panel 6. The middle panel 6 and the said one end panel 4 are folded about the other transverse fold line 10 between the middle panel 6 and the other end panel 8 so as to lie above the other end panel 8. In the folded configuration the middle panel 6 and the other end panel 8 form front and back cover panels, respectively, for the said one end panel 4. A portion 14 of the said one end panel 4 overlaps the free outer edge 16 of the other end panel 8 and the outer surface of the over-lapping portion 14 is coated with a band of release material 18. Typically, the band of release material 18 comprises a mixture of a polysiloxane and a varnish. Preferably, the mixture contains from 90 to 99.5 vol % polysiloxane, such as a polysiloxane manufactured under the code name WS70M and WS78L by Wacker and sold in Great Britain by Ambersil Limited, Basingstoke, Hampshire as Silicone Fluid F100, and from 0.5 to 10 vol % varnish, such as an overprinting varnish made by Fishburn and having the code name XF 05546. The middle panel 6 is provided with a transverse weakened tear line 20, such as a line of perforations, adjacent the transverse fold line 10 between the middle panel 6 and the back cover panel 8.

In an alternative arrangement, the transverse weakened tear line 20 is provided in the back cover panel 8 adjacent the transverse fold line 10. In a further alternative arrangement, the transverse weakened tear line 20 is provided along the transverse fold line 10. The back cover panel 8 is adhered to a support web 22 by a layer 23 of adhesive, e.g. a water soluble adhesive such as pVA (poly vinyl alcohol) and the band of release material 18 on the end panel 4 is adhered to the support web 22 by a corresponding band 24 of adhesive. The support web 22 is coated on its rear surface by a pressure sensitive adhesive so that the support web 22 is self-adhesive. The support web 22 is releasably carried on a length of release backing material 26.

In use, the support web 22 is adhered by its self-adhesive surface to a container such as a bottle. The label is held in its closed configuration by the adhesion of the middle panel 6 to the support web 22.

When it is desired to open the label, the overlapping portion 14 of the end panel 4 is pulled away from the support web 22 by separating the band of release material 18 from the band of adhesive 22 thereby to permit the label to be unfolded about the transverse fold line 10. The said end panel 4 and the middle panel 6 may then be separated from the back cover panel 8 by tearing along the weakened tear line 20. The torn off sheet consisting of the end panel 4 and the middle panel 6 may then be read by a user.

The present invention can provide a label which permits a part thereof to be torn off easily by a user and which can be easily and inexpensively manufactured. The folded sheet which is adhered to the support web is required to be relatively short when compared with other known "extended text" labels and the arrangement of the invention permits the majority of the folded sheet to be torn off by a user. Furthermore, the invention has particular application in the labelling of plastics bottles having circumferential surfaces which are provided with inwardly directed strengthening grooves. By having a double thickness tear-off strip at the front of the adhered label and by having a support web adhered to the bottle, the tear off strip tends not to conform to the outer shape of the bottle and tends to remain uncreased and flat.

What I claim is:

1. A label for attachment to a container, the label comprising a longitudinal strip which is divided into a series of panels by a plurality of transverse fold lines, the strip being folded about the transverse fold lines so that one end panel and the adjacent panel form rear and front cover panels, respectively, which envelope the remaining panel or panels of the folded strip, the rear cover panel of the strip being shorter in the longitudinal direction that at least the front cover panel and a third panel, which is adjacent the front panel, extending beyond the free end of the rear cover panel and having a rearwardly directed over-lapping portion; and a support web to which is adhered *the edge margin of* the rear face of the rear cover panel, *adjacent said front cover panel,* the *edge margin of the* over-lapping portion *adjacent said front cover panel* being releasably adhered to the support web so as to maintain the folded label in a closed configuration, the arrangement being such that the label can be opened by detaching the over-lapping portion from the support web.

2. A label according to claim 1 wherein a weakened tear line is provided adjacent the transverse fold line which is between the rear and front cover panels.

*3. A label for attachment to a container, the label comprising a longitudinal strip which is divided into a series of panels by a plurality of transverse fold lines, the strip being folded about the transverse fold lines so that the panel adjacent to a first panel forms a front cover panel, said front cover panel trapping the remaining panel or panels of the folded strip between said front panel and a support web, to which is adhered the edge margin of the rear face of the said first panel adjacent said front cover panel, the said first panel of the strip being shorter in the longitudinal direction than at least the front cover panel and a third panel, which is adjacent the front panel, said third panel extending beyond the free end of the said first panel and having a rearwardly directed surface; the edge margin of said rearwardly directed surface adjacent said front cover panel being releasably adhered to the support web so as to maintain the folded label in a closed configuration, the arrangement being such that the label can be opened by detaching said rearwardly directed surface portion from the support web.*

*4. A label for attachment to a container, the label comprising a longitudinal strip which is divided into a series of panels by a plurality of transverse fold lines, the strip being folded about the transverse fold lines so that one panel and the adjacent panel form a first panel and a front cover panel, respectively, said first panel of the strip being shorter in the longitudinal direction than at least the front cover panel and a third panel, which is adjacent the front panel, said third panel extending beyond the free end of said first panel and having a rearwardly directed surface which reaches beyond the end of said first panel, and a support web to which is adhered the edge margin of the rear face of said first panel adjacent said front cover panel, the edge margin of said rearwardly directed surface of said extending portion adjacent said front cover panel being releasably adhered to the support web so as to maintain the folded label in a closed configuration, the arrangement being such that the label can be opened by detaching the portion from the support web.*

*5. A label for attachment to a container, the label comprising a longitudinal strip which is divided into a series of panels by a plurality of transverse fold lines, the strip being folded about the transverse fold lines so that one panel forms a front cover panel, said front cover panel forming part of an envelope containing the remaining panel or panels of the folded strip, the first panel of the strip adjacent said front cover panel being shorter in the longitudinal direction than at least said front cover panel, and a third panel, which is adjacent the front cover panel, extending beyond the free end of the said first panel and having a rearwardly directed surface; and a support web to which is adhered the edge margin of the rear face of the said first panel adjacent said front cover panel, the edge margin of said rearwardly directed surface adjacent said front cover panel being releasably adhered to the support web so as to maintain the folded label in a closed configuration, the arrangement being such that the label can be opened by detaching the rearwardly directed surface from the support web.*

*6. A label according to claim 1, wherein the whole of said rear face of the rear cover panel is adhered to said support web.*

* * * * *